United States Patent [19]

Le Rue

[11] Patent Number: 5,694,469

[45] Date of Patent: Dec. 2, 1997

[54] METHOD AND SYSTEM FOR DISSEMINATING STORED PROGRAMS AND DATA

[76] Inventor: Charles Le Rue, 1432 Olive La., La Canada, Calif. 91011

[21] Appl. No.: 560,288

[22] Filed: Nov. 17, 1995

[51] Int. Cl.⁶ ......................................................... H04L 9/00
[52] U.S. Cl. .......................... 380/4; 340/825.31; 395/186
[58] Field of Search ................................ 395/186, 188.01, 395/201, 202, 203; 380/4, 46; 340/825.31; 360/60

[56] References Cited

U.S. PATENT DOCUMENTS

| | | | |
|---|---|---|---|
| 4,471,163 | 9/1984 | Donald et al. | 380/4 |
| 4,651,279 | 3/1987 | Suzuki | 395/218 |
| 4,866,769 | 9/1989 | Karp | 380/4 |
| 4,888,798 | 12/1989 | Earnest | 380/4 |
| 5,291,598 | 3/1994 | Grundy | 395/186 |
| 5,319,705 | 6/1994 | Halter et al. | 380/4 |
| 5,499,295 | 3/1996 | Cooper | 380/23 |

*Primary Examiner*—Thomas H. Tarcza
*Assistant Examiner*—Pinchus M. Laufer
*Attorney, Agent, or Firm*—Loeb & Loeb LLP

[57] ABSTRACT

A method for accessing a selected group of data which is stored on a machine readable storage medium, which method includes: assigning a first identifying designation to the storage medium; assigning a second identifying designation to a machine which can read the storage medium; assigning a third identifying designation to the selected group of data; obtaining an access code which is a function of the first, second and third identifying designations; inputting the access code into the machine; and processing the access code in the machine for receiving the third identifying designation.

A data processing system including: a data storage medium storing a plurality of groups of data and a machine readable first identifying designation which identifies the storage medium; and a machine composed of components for reading the storage medium, storing a machine readable second identifying designation which identifies the machine, inputting a code uniquely associated with the first and second identifying designations and with at least one selected group of stored data, and accessing data stored on the storage medium in response to inputting of the code.

11 Claims, 2 Drawing Sheets

METHOD AND SYSTEM FOR DISSEMINATING STORED PROGRAMS AND DATA

BACKGROUND OF THE INVENTION

The present invention relates to the dissemination of stored programs and data collections for use in data processing systems.

Commercial dissemination of programs and databases is generally effected by fixing them on a storage medium, such as a diskette or CD ROM, packaging the storage medium together with documentation and placing the resulting packages on sale at retail outlets. The price of the package will depend essentially on the costs incurred in generating the programs or the databases, the cost of producing the storage medium being, in relative terms, inconsequential.

There is a clear trend toward storage media having ever larger capacities. For example, a CD ROM can store many times more data than a computer diskette. Therefore, many programs, or sets of programs, or databases can be stored on a single CD ROM and to do so could create significant economies in connection with packaging and distribution and would reduce the number of media which an individual must acquire. However, the primary obstacle to such an approach would be the price that must be charged for such CD ROM in order to recover the expenses involved in generating all of the programs or databases on that medium.

SUMMARY OF THE INVENTION

It is an object of the present invention to simplify and facilitate the distribution of programs and databases fixed on large capacity storage media.

Another object of the invention is to allow consumers to purchase only a portion of the proprietary material fixed on a storage medium.

Yet another object of the invention is to prevent unauthorized access to any material on such a storage medium.

Yet another object of the invention is to render "pirating" (unauthorized cloning of the CD ROMs) unprofitable.

Yet another object of the invention is to enable the purchaser of a storage medium to obtain access to different materials on the medium as needed.

The above and other objects are achieved, according to the present invention, by a method and system for accessing a selected group of data which is stored on a machine readable storage medium, comprising: assigning a first identifying designation the storage medium; assigning a second identifying designation to a machine which can read the storage medium; assigning a third identifying designation to the selected group of data; obtaining an access code, or pass code, which is a function of the first, second and third identifying designations; and inputting the access code into the machine to enable the machine to perform an inverse process in order to access the selected group of data on the storage medium.

The invention will be described herebelow with reference to computer controlled navigation systems of the type which can be installed in an automotive vehicle or carried by a pedestrian.

Automobile navigation systems require access to large digitized map databases covering large geographic areas. One efficient way to provide navigation systems with such databases is to place the digitized map databases on CD ROMs which may be read by the navigation computer via a CD ROM player. Although the cost of the plastic CD ROM itself is small, the data on the CD ROM is very difficult and expensive to acquire and thus there are high royalties associated with the use of such databases. Because of this fact, databases are generally sold in small units called "metropolitan areas" in much the same way that map books are sold. For example, one metro area could include the greater New York metropolitan area while another could include the Washington, DC metropolitan area.

Because of the large storage capacity on a CD ROM, one disc could hold a number of metropolitan areas. This would be beneficial because it would cost less and would make it more convenient for the user to have fewer discs to have to manage. However, if more than one metro area is placed on the disc, a way must be found to "sell" specific databases on the disc to the user and to allow the user access to these databases while preventing the use of other databases for which he has not paid. If, at a later time, the user wants to activate other databases on the disc, a way must be provided for him to do so.

The invention utilizes an identifying designation, such as a serial number, assigned to the navigator hardware and an identifying designation assigned to the CD ROM, in conjunction with a designation of the specific data collection which it is desired to use to secure an access code, or pass code. Once that access code is known, it is utilized in the device in combination with the hardware and CD ROM identifying designations to unlock the appropriate CD ROM files.

In the case of a navigator, each individual machine contains a non-volatile memory in which is permanently stored a unique serial number for that machine. This serial number is stored in a manner to enable it to be read within the machine. This serial number, or a counterpart alphanumeric designation, is also provided at a visible location on the machine or as part of the documentation which comes therewith.

For user convenience, the machine will also be packaged with one or more CD ROMs containing the software for operating the navigator and map databases for all, or some, or some of the geographic areas for which the manufacturer has obtained the necessary map data. Assuming that all of the map data available to the manufacturer can be placed on a reasonable number of CD ROMs, storage of all of that data on a set of CD ROMs would greatly simplify production and distribution of the CD ROMs. It will be appreciated that actual fabrication of a CD ROM is relatively inexpensive. Each CD ROM carries an identifying designation which is specific to its contents. This designation is stored on the CD ROM in machine readable form and is provided on a visible label on the CD ROM.

The material included in the product package would also include a listing providing an identifying designation for each group of data, or map database.

When a user wants to obtain access to a particular database or databases, he would contact, for example via telephone, the manufacturer, or a service which acts on behalf of the manufacturer, and would provide, either by voice or by operation of a telephone keypad, the machine or hardware serial number, the CD ROM designation code and the designation of each database to be accessed. A suitable system would be established to allow the user to pay the necessary fee for obtaining the desired database or databases. The manufacturer or service would then provide an access code which is based on a combination of the items of information provided by the user.

According to a particular novel feature of the invention, the access code would be generated from pseudorandom encryptions of the information supplied by the user. Techniques for achieving this result will be described subsequently herein.

The user would then input the access code into his machine, where it would be combined with the machine identification number and the CD ROM identification number, according to an inverse pseudorandom function to generate an output which unlocks the designated databases on the CD ROM.

DESCRIPTION OF THE PREFERRED EMBODIMENTS

Figure 1:
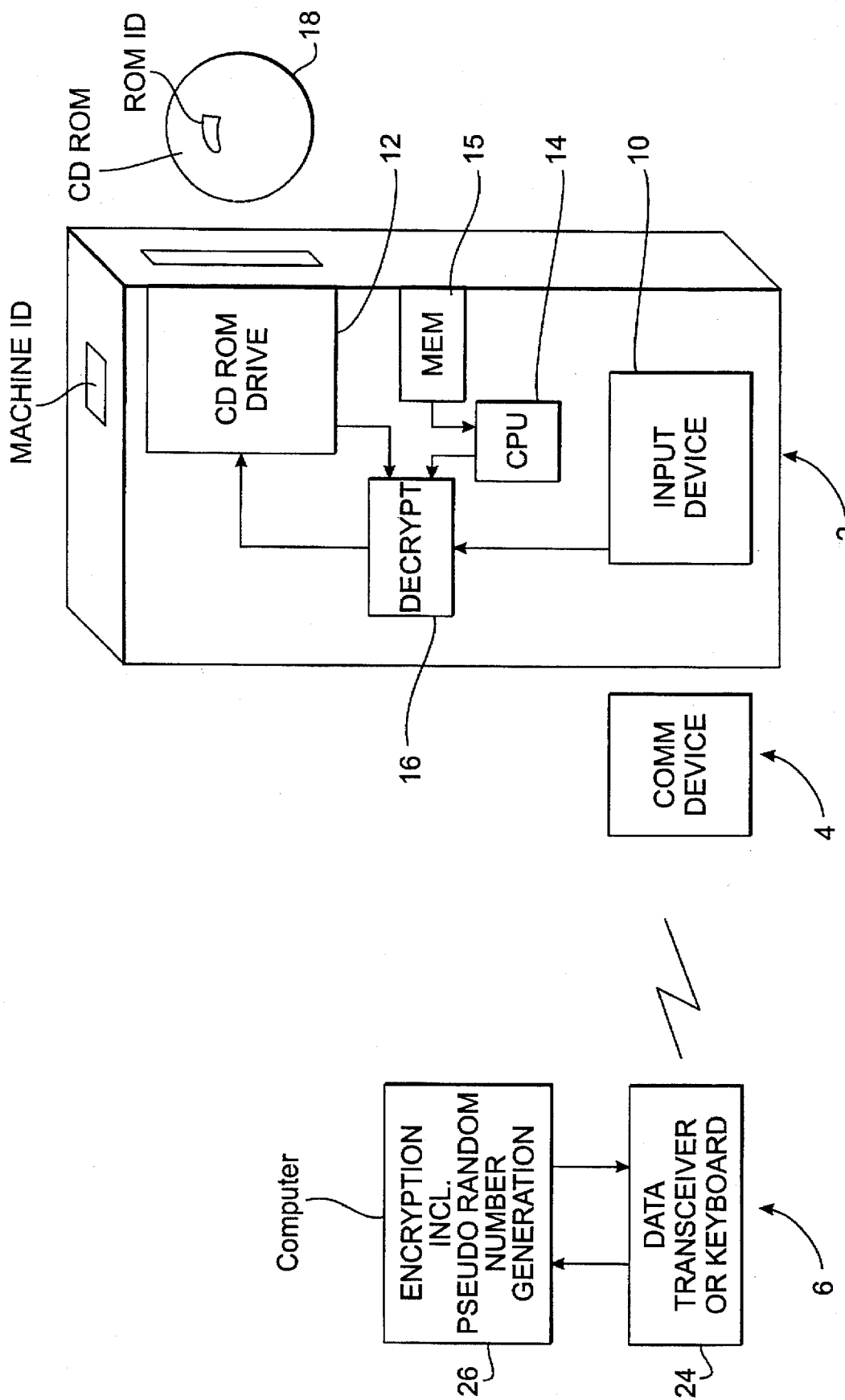
FIG. 1 is a simplified pictorial view of a system according to the present invention.

A complete system according to the invention can be considered to include, as shown in FIG. 1, a navigator 2, a communication device 4, which may be a conventional telephone, and a central station 6 where an automated encryption system or a human operator using a suitable encryption computer can communicate with the communication device via a telephone line.

Navigator 2 is composed basically of an input device 10, a CD ROM drive 12, a CPU 14, a non-volatile memory, 15, containing the hardware serial number and a decryption program in a unit 16. Navigator 2 will be associated with one or more CD ROMs 18.

Navigator 2 may basically be constructed as disclosed in U.S. Pat. No. 5,274,560, which issued to Charles LaRue on Dec. 28, 1993. While the navigator will typically have other components, those illustrated in FIG. 1 are the components required to implement the present invention.

Input device 10 may be constructed to receive any type of input. For example, input device 10 may be a keyboard to receive a manual input or a microphone and speech recognizer to receive a voice input.

Navigator 2 has an identifying designation (machine ID), which may be unique to that particular machine. This designation appears in legible form on the outside of the navigator and is also stored in memory 15. Each CD ROM 18 has a respective identifying designation, which appears in legible form on a label area (ROM ID) and which is also stored in machine readable form on the CD ROM. A ROM ID is unique to a particular CD ROM edition, or version. Thus, all CD ROMs made from the same master will have the same ROM ID.

When a user wishes to gain access to, or unlock, a particular group of data, which will typically be composed of a plurality of files, the user contacts central station 6 via a telephone line from communication device 4. After establishing contact, either with a human operator or a voice operated system, the user transmits, by speaking or keying in the machine ID, the ROM ID and a designation of the desired group of data. For this purpose, the user will be provided with a listing of the groups of data available on the CD ROM and the designation assigned to each such group.

Alternatively, a label on the CD ROM would designate the available databases.

In the central station 6, this information is conducted from a data transceiver to an encryption computer 26 which generates an access code which is a function of the three items of information which had been transmitted from communication device 4.

In preferred embodiments of the invention, generation of the access code is based on pseudorandom operations. This could involve combining the three numerical values in any predetermined manner, adding a pseudorandomly generated number and taking selected digits of the respective sum. According to another possibility, selected digits of each of the three numerical values are combined with a pseudorandomly generated number. According to other possibilities, all or some of the digits of the three numerical values could be combined according to a function represented by a pseudorandom number.

According to preferred embodiments of the invention, the pseudorandom operations involve substituting pseudorandomly generated numbers for individual or combined numerical values.

Techniques for encryption by the use of pseudorandom numbers are quite well known in the art and any such technique may be utilized in the practice of the present invention.

The resulting access code is then conveyed to the user, via communication device 4. The user can then input that number via input device 10 and it will be processed, in decryption unit 16, with the machine ID number, which will be read from memory 15, and the ROM ID, which will be read from CD ROM 18. The decryption unit 16 generates pseudorandom numbers that are appropriately related to that generated in device 26, and processes the access code inputted via input device 10, the machine ID and the CD ROM ID with internally generated pseudorandom numbers to generate address information for the group of data which is to be made available to the user. This information is delivered to drive 12 in order to allow readout of that data.

The use of pseudorandom numbers to both generate and decode the access code serves to greatly reduce the likelihood of obtaining unauthorized access to any data stored on a CD ROM. The security of this arrangement is further enhanced by the fact that the access code is a function of not only the ROM ID, but also the machine ID. This means that even if an access code were obtained with respect to one machine, it would not be operative if an attempt were made to use the same CD ROM in a different machine, even if the first and second machines are identical models. In this case, also, the use of pseudorandom numbers to both generate and decrypt the access code assures that one cannot derive an access code for a different machine of the same model simply by noting the differences between the machine IDs of the two machines.

When a user wishes to obtain access to additional groups of data on a CD ROM, the new access code, for which the user will make appropriate payment, will be operative to permit access to both the new collections of data as well as the collections of data for which the customer previously paid.

The performance of a pseudorandom operation on an identifying designation will be referred to hereinafter as randomizing. One example of this procedure is the following.

A table of pseudorandom numbers, the range of which does not exceed the length of the tables and which does not include any repetitions, can be created using known programs. For example, the C-compiler, which is commercially available public domain software, includes a program called "Random" which will generate a pseudorandom series of numbers. Each entry of the table would include an address corresponding to an identifying designation value and a pseudorandomly generated number stored at that address as data. Of course, each pesudorandom number can have any number of bits. Since the same pseudorandom number generating program, or programs, are stored in encryption unit 26 of central station 6 and in decryption unit 16 in navigator 2, the same pseudorandom tables can be generated at both locations.

After the table has been generated, the identifying designation, or selected digits of that designation, will serve as the address from which the generated pseudorandom number is read.

The same table, or another generated table, can be used to randomize an intermediate value produced during the encryption operation.

Recovery of a number which has been thus randomized will be referred to herein as unrandomizing. This can be achieved, according to the present invention, by searching the appropriate table of pseudorandom numbers to locate the table entry in which the pseudorandom number is stored as data. The address of that entry is then read out as the unrandomized number.

To avoid the need for a very large memory to store the pseudorandom number tables, the size of such tables should be limited. This can be done by appropriate "folding" of long numbers and/or by using a division process, or "modulus operation". For example, if it is desired to limit a number to a range of between 0 and 999, and the numbers originally cover a larger range, each number can be divided by a given value, for example 1000, yielding an integer and a remainder. The remainder would always fall within the desired range and would be used as the actual number. For example, if the original number is 10404, division of that number by 1000 would yield a remainder of 404.

On the CD ROM, a plurality of groups of data, or databases, are stored. Each database may contain road map data for a given geographical area. A directory on the CD ROM can be in the form of a bit map having a number of bits equal to the number of databases. Each bit position will be associated with a particular database. Each database that can be accessed will be represented by a binary "1" at the associated bit map location. For example, if the first, third and tenth databases, representing different geographic areas, are to be accessed, or enabled, the bits at locations 0, 2 and 9 of the bit map would be set to a value of "1". Assuming that the bit at location 0 is the lowest order bit ($2^0$), the decimal value represented by this bit map would be: $2^0+2^2+2^9=517$.

The length of a pass code will represent a compromise between competing considerations. Specifically, the longer the pass code, the lower the likelihood that one can arrive at the correct pass code in an unauthorized manner. On the other hand, a shorter pass code will make the system more convenient for the user.

It will be noted that achievement of the results contemplated by the present invention does not depend primarily on the number of digits in the pass code or even in the manner in which the parts of the pass code are randomized. Rather, it is based on the use of a built-in hardware serial number, a disk ID and a bit map to generate the pass code and the use of the same hardware serial number and disk ID, along with the generated pass code, to retrieve the bit map.

Preferably, the pass code is supplied to the user in decimal form and the necessary decimal-binary conversion will be performed in the navigator.

Figure 2:
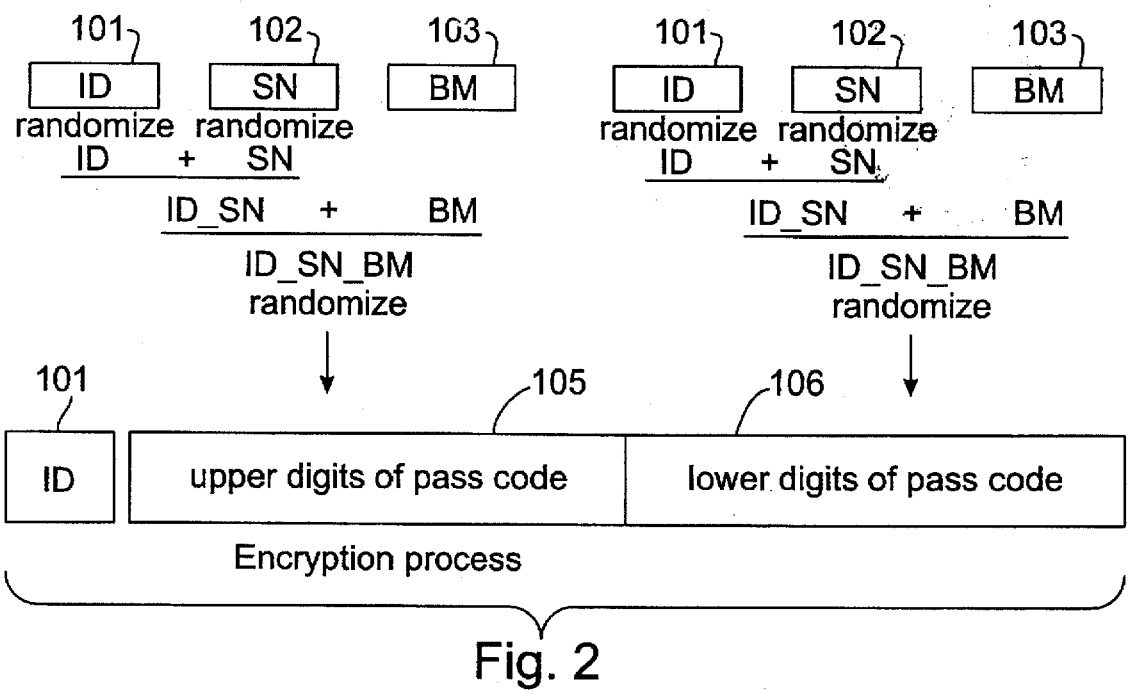
FIGS. 2, 3 and 4 are pictorial views of various operations performed to implement the invention.

An example of one embodiment of an encryption scheme according to the present invention is shown in FIG. 2. The first identifying designation 101, representing the identification number assigned to the CD ROM is subjected to a first randomizing process in which it is converted into, or replaced by, a first pseudorandomly generated number. The same operation is performed on the second identifying designation 102 representing the machine serial number to form a second pseudorandomly generated number. The two pseudorandomly generated numbers are then added together to form a value ID_SN. This sum is then added to a bit map number 103 (BM) which constitutes the third identifying designation identifying one or more selected groups of data.

The new sum ID_SN_BM is subjected to a randomizing process to produce a third pseudorandom number which is used to produce an upper group of digits 105 of the resulting access code, or pass code.

The above process is repeated, possibly with different randomizing functions, to produce the lower digits 106 of the pass code. In the example illustrated, the same randomizing functions are used. Finally, to complete the pass code, the original first identifying designation is prefixed to the pass code to make the pass code specific to the particular CD ROM identification number.

The resulting pass code is then transmitted back to the user.

Figure 3:
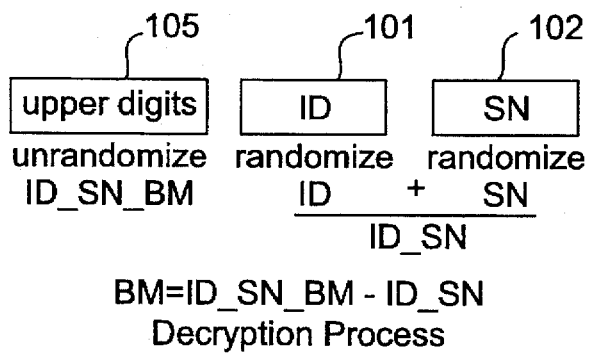

Referring now to FIG. 3, a process for accessing the desired group or groups of data stored on the CD ROM involves performing on the CD ROM identifying designation 101 and the machine identifying designation 102 the same randomizing operations as those performed during encryption, resulting in generation of the data value ID_SN. The upper digits 105 of the inputted pass code are unrandomized to recreate ID_SN_BM, from which ID_SN is subtracted to yield BM.

Figure 4:
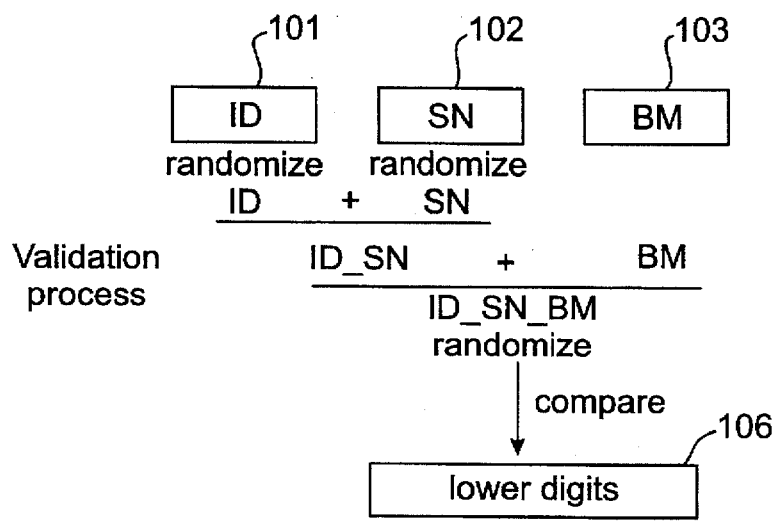

According to a further feature of the invention, proper receipt of the pass code can be verified in the machine by regenerating the lower order digits 106 of the pass code and comparing that with the lower order digits received from central station 6. This procedure is illustrated in FIG. 4 where the disk identifying designation 101 and the machine identifying designation 102 are each subjected to the same pseudorandom conversion or conversions as those performed to generate the lower order digits in the procedure described with reference to FIG. 2. The resulting numbers are added to create the value ID_SN, which is added to the third identifying designation to form ID_SN_BM. This number is then randomized by the same pseudorandom conversion as that performed in the procedure described with reference to FIG. 2 and the resulting number is compared with the received lower order digits 106. A successful comparison indicates that the pass code has been properly received.

After the bit map has been extracted, it can be stored in memory 15 (FIG. 1) and can be used by CPU 14 to directly address the CD ROM during subsequent uses of the navigator.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for accessing a selected group of data which is stored on a machine readable storage medium, comprising:

assigning a first identifying designation to the storage medium;

assigning a second identifying designation to a machine which can read the storage medium;

assigning a third identifying designation to the selected group of data;

obtaining an access code which is a function of the first, second and third identifying designations;

inputting the access code into the machine; and processing the access code in the machine for generating the third identifying designation.

2. A method as defined in claim 1 wherein the second identifying designation is unique to the machine.

3. A method as defined in claim 1 wherein the third identifying designation is unique to the selected group of data.

4. A method as defined in claim 1 further comprising storing the first identifying designation in a machine readable form in the machine, and wherein said step of processing includes processing the access code as a function of the first identifying designation.

5. A method as defined in claim 1 wherein said step of processing includes deriving the third identifying designation as a function of the first and second identifying designations and the access code.

6. A method as defined in claim 1 wherein said step of obtaining an access code comprises: transmitting the first, second and third identifying designations to a central facility via a telephone link; at the central facility processing the identifying designations to derive the access code; and transmitting the derived access code from the central facility via the telephone link.

7. A method as defined in claim 1 wherein said step of obtaining an access code comprises modifying at least one of the first and second identifying designations according to a pseudorandom function.

8. A method as defined in claim 7 further comprising storing the first identifying designation in the machine and said step of processing the access code comprises again performing said modifying step.

9. A data processing system comprising:

a data storage medium storing a plurality of groups of data and a machine readable first identifying designation which identifies the storage medium;

a machine including: means for reading the storage medium, means storing a machine readable second identifying designation which identifies the machine, input means and a control unit connected for accessing data stored on said storage medium in response to inputting, via said input means, of a code uniquely associated with the first and second identifying designations and with at least one selected group of stored data.

10. A system as defined in claim 9 wherein the code contains a pseudorandomly generated number associated with a combination of the identifying designations and the at least one selected group of stored data, said control unit comprises decryption means for processing the pseudorandomly generated number to derive an identification of the at least one selected group of data.

11. A system as defined in claim 9 constituting a navigator for producing travel routing directions.

* * * * *